(12) United States Patent
Fujitsuna et al.

(10) Patent No.: US 7,352,151 B2
(45) Date of Patent: Apr. 1, 2008

(54) METHOD OF ESTIMATING MAGNETIC POLE POSITION IN MOTOR AND APPARATUS OF CONTROLLING THE MOTOR BASED ON THE ESTIMATED POSITION

(75) Inventors: Masami Fujitsuna, Kariya (JP); Akihrio Imura, Oobu (JP)

(73) Assignee: Denso Corporation, Kariya (JP)

( * ) Notice: Subject to any disclaimer, the term of this patent is extended or adjusted under 35 U.S.C. 154(b) by 6 days.

(21) Appl. No.: 11/525,139

(22) Filed: Sep. 22, 2006

(65) Prior Publication Data
US 2007/0085508 A1 Apr. 19, 2007

(30) Foreign Application Priority Data
Oct. 13, 2005 (JP) .............................. 2005-299242

(51) Int. Cl.
*H02P 6/18* (2006.01)
(52) U.S. Cl. ........................ 318/721; 318/254; 318/712
(58) Field of Classification Search ................ 318/138, 318/254, 439, 700, 712–724
See application file for complete search history.

(56) References Cited

U.S. PATENT DOCUMENTS 6,339,308 B2 * 1/2002 Shinnaka .................... 318/701
6,396,229 B1    5/2002 Sakamoto et al.
6,822,417 B2 * 11/2004 Kawaji et al. ............... 318/701
6,940,250 B2 *  9/2005 Nishimura et al. ......... 318/705
7,221,152 B2 *  5/2007 Piippo .................... 324/207.25

FOREIGN PATENT DOCUMENTS

| JP | A 9-182499   | 7/1997 |
| JP | A 2001-251889 | 9/2001 |
| JP | A 2002-272196 | 9/2002 |
| JP | A 2005-130691 | 5/2005 |

* cited by examiner

*Primary Examiner*—Bentsu Ro
(74) *Attorney, Agent, or Firm*—Oliff & Berridge, PLC (57) ABSTRACT

A magnetic pole position in a synchronous motor having salient poles is estimated from an instructed voltage applied to the motor, a current generated from the instructed voltage and parameters. To estimate the position substantially matching with a true magnetic pole position, a phase matching voltage having a phase matching with the estimated magnetic pole position previously obtained is applied to the motor. The phase matching voltage has a harmonic frequency higher than that of the instructed voltage. A phase matching current generated from the phase matching voltage is detected from the motor. A value of at least one of the parameters is corrected such that a difference in phase between the phase matching voltage and the phase matching current substantially becomes zero. An estimated magnetic pole position is calculated from the instructed voltage, the generated current and the parameter having the corrected value.

15 Claims, 6 Drawing Sheets

METHOD OF ESTIMATING MAGNETIC POLE POSITION IN MOTOR AND APPARATUS OF CONTROLLING THE MOTOR BASED ON THE ESTIMATED POSITION

CROSS-REFERENCE TO RELATED APPLICATION

This application is based upon and claims the benefit of priority of the prior Japanese Patent Application 2005-299242 filed on Oct. 13, 2005 so that the contents of which are incorporated herein by reference.

BACKGROUND OF THE INVENTION

1. Field of the Invention

The present invention relates to a method of estimating a position (e.g., magnetic pole position) of a rotor in a synchronous motor and an apparatus of controlling the motor based on the estimated position.

2. Description of Related Art

In a synchronous motor such as a surface permanent-magnetic synchronous motor (SPMSM) or an internal permanent-magnetic synchronous motor (IPMSM), permanent magnets are used for a rotor, and S and N magnetic poles formed by the permanent magnets are alternately disposed around a rotor shaft. During the operation of this motor, an alternating current voltage is applied to windings of a stator, and an alternating current generated from the applied voltage flows through the windings. A phase of the voltage is controlled in synchronization with a position (e.g., magnetic pole position) of a rotor. Therefore, a position detector for detecting the magnetic pole position of the rotor is required. As this detector, a Hall element, an encoder or a resolver is used. However, it is difficult to downsize a motor with a position detector, and it is required to connect the detector with a controller for controlling the motor through connection lines.

Therefore, to control a synchronous motor without using any position detector, a magnetic pole position of a rotor in a motor has recently been estimated by using an induced voltage of the motor. During the operation of the motor, the motor itself induces a voltage which is changed with the magnetic pole position. Therefore, the magnetic pole position can be estimated from the induced voltage. For example, Published Japanese Patent First Publication No. 2001-251889 discloses a motor model expression approximated on a dq rotational coordinates system having a d-axis and a q-axis to estimate a magnetic pole position based on an induced voltage. The d-axis is set so as to be directed from an S magnetic pole to an N magnetic pole in a rotor. The q-axis is set to be orthogonal to the d-axis on a plane perpendicular to a rotation axis of the rotor. An original point of the coordinates system is placed on the rotation axis.

In the estimation using this motor model expression, apparatus parameters set at constant values are used for constituting a motor model expression, and a shaft shift $\Delta\theta$ of an estimated pole position from a true pole position (i.e., d-axis) in a synchronous motor is calculated from a component Idc (hereinafter, called d-axis component) of a detected direct current along the d-axis, a component Iqc (hereinafter, called q-axis component) of the detected direct current along the q-axis, a d-axis component V*d of a voltage applied to the motor, a q-axis component V*q of the applied voltage and an instructed rotational speed $\omega$*r of the rotor. An estimated magnetic pole position of the rotor is calculated from the shift $\Delta\theta$.

However, the parameter values appropriate to an actual motor are varied due to various causes. For example, even though motors are produced in mass production, sizes and shapes of constituting parts of one motor differ from those of the other motors. In this case, a true value of each parameter in a motor is determined in dependent on the sizes and shapes of parts of the motor. Further, the parameter values appropriate to a motor are varied when a magnetic field is saturated in the motor.

To solve this problem, for example, Published Japanese Patent First Publication No. 2005-130691 discloses a voltage formula as a motor model expression. In this model, to minimize an error in an estimated magnetic pole position, a q-axis inductance denoting one of apparatus parameters is renewed, and an estimated magnetic pole position is determined according to a motor model expression using the renewed inductance. More specifically, a first estimated magnetic pole position is calculated according to a motor model expression using an instructed voltage applied to a motor, a current detected from the motor and a changeable q-axis inductance, and a second estimated magnetic pole position is calculated without using any q-axis inductance. The q-axis inductance is renewed based on a difference between the first and second positions, and a magnetic pole position is estimated based on the renewed inductance at a next estimation cycle.

However, in this Publication, because two estimated positions are calculated for each estimation cycle, a large amount of calculation is required to correctly estimate a magnetic pole position.

SUMMARY OF THE INVENTION

An object of the present invention is to provide, with due consideration to the drawbacks of the conventional estimation of a magnetic pole position, a method wherein a magnetic pole position of a rotor in a motor is accurately estimated according to a motor model expression using a corrected parameter while reducing an amount of calculation. Further, the object is to provide an apparatus of controlling a motor based on the estimated magnetic pole position.

According to a first aspect of this invention, the object is achieved by the provision of a method of estimating a magnetic pole position in a synchronous motor having salient poles, comprising the steps of providing a motor model expression for estimating the magnetic pole position from an instructed voltage applied to the motor, a current generated from the instructed voltage and a parameter, and calculating an estimated magnetic pole position in the motor from the instructed voltage, the generated current and the parameter according to the motor model expression. The step of calculating the estimated magnetic pole position comprises (1) applying, to the motor, a phase matching voltage which has a frequency higher than that of the instructed voltage and has a phase matching with the estimated magnetic pole position previously obtained, (2) detecting a phase matching current generated from the phase matching voltage from the motor, (3) correcting a value of the parameter such that a difference in phase between the phase matching voltage and the phase matching current substantially becomes zero, and (4) calculating an estimated magnetic pole position from the instructed voltage, the generated current and the parameter having the corrected value.

Accordingly, because the estimation of a magnetic pole position is performed once every estimation cycle, an amount of calculation for estimating a magnetic pole position can be reduced. Further, because the parameter is corrected such that a difference in phase between the phase matching voltage and the phase matching current substantially becomes zero, the estimated magnetic pole position can reliably approach a true magnetic pole position.

The object is also achieved by the provision of an apparatus of controlling a synchronous motor having salient poles, comprising an estimating unit which estimates a magnetic pole position in the motor from an instructed voltage applied to the motor, a current generated from the instructed voltage and a parameter, and a control unit which controls the motor according to the estimated magnetic pole position. The estimating unit has (1) an applying unit which applies, to the motor, a phase matching voltage which has a frequency higher than that of the instructed voltage and has a phase matching with the estimated magnetic pole position previously obtained, (2) a detecting unit which detects a phase matching current generated from the phase matching voltage from the motor, (3) a correcting unit which corrects a value of the parameter such that a difference in phase between the phase matching voltage and the phase matching current substantially becomes zero, and (4) a calculating unit which calculates an estimated magnetic pole position from the instructed voltage, the detected current and the parameter having the corrected value. The control unit controls the motor according to the estimated magnetic pole position calculated in the calculating unit.

Because an amount of calculation for estimating a magnetic pole position is reduced, the control unit can promptly control the motor according to the estimated magnetic pole position. Further, parts required for the calculation can be simplified, so that the control unit can be downsized.

According to a second aspect of this invention, the object is achieved by the provision of a method of estimating a magnetic pole position of a rotor in a synchronous motor, comprising the steps of providing a motor model expression for estimating the magnetic pole position from an instructed voltage determined from an instructed rotational speed of the rotor and applied to the motor, a current generated from the instructed voltage and a parameter, and calculating an estimated magnetic pole position in the motor from the instructed voltage, the generated current and the parameter according to the motor model expression. The step of calculating the estimated magnetic pole position comprises (1) calculating an actual power factor angle from a difference in phase between the instructed voltage and the generated current, (2) calculating a normal power factor angle from the instructed rotational speed and a torque of the rotor, (3) correcting a value of the parameter such that the actual power factor angle substantially coincides with the normal power factor angle, and (4) calculating an estimated magnetic pole position from the instructed voltage, the generated current and the parameter having the corrected value.

Accordingly, because the estimation of a magnetic pole position is performed once every estimation cycle, an amount of calculation for estimating a magnetic pole position can be reduced. Further, because the parameter is corrected such that the actual power factor angle substantially coincides with the normal power factor angle, the estimated magnetic pole position can reliably approach a true magnetic pole position.

The object is also achieved by the provision of an apparatus of controlling a synchronous motor, comprising an estimating unit which estimates a magnetic pole position of a rotor in the motor from an instructed voltage determined from an instructed rotational speed of the rotor and applied to the motor, a current generated from the instructed voltage and a parameter, and a control unit which controls the motor according to the estimated magnetic pole position. The estimating unit has (1) a first calculator which calculates an actual power factor angle from a difference in phase between the instructed voltage and the generated current, (2) a second calculator which calculates a normal power factor angle from the instructed rotational speed and a torque of the rotor, (3) a correcting unit which corrects a value of the parameter such that the actual power factor angle substantially coincides with the normal power factor angle, and (4) a third calculator which calculates an estimated magnetic pole position from the instructed voltage, the generated current and the parameter having the corrected value.

Because an amount of calculation for estimating a magnetic pole position is reduced, the control unit can promptly control the motor according to the estimated magnetic pole position. Further, parts required for the calculation can be simplified, so that the control unit can be downsized.

DETAILED DESCRIPTION OF THE PREFERRED EMBODIMENTS

Embodiments of the present invention will now be described with reference to the accompanying drawings, in which like reference numerals indicate like parts, members or elements throughout the specification unless otherwise indicated.

Embodiment 1

Figure 1:
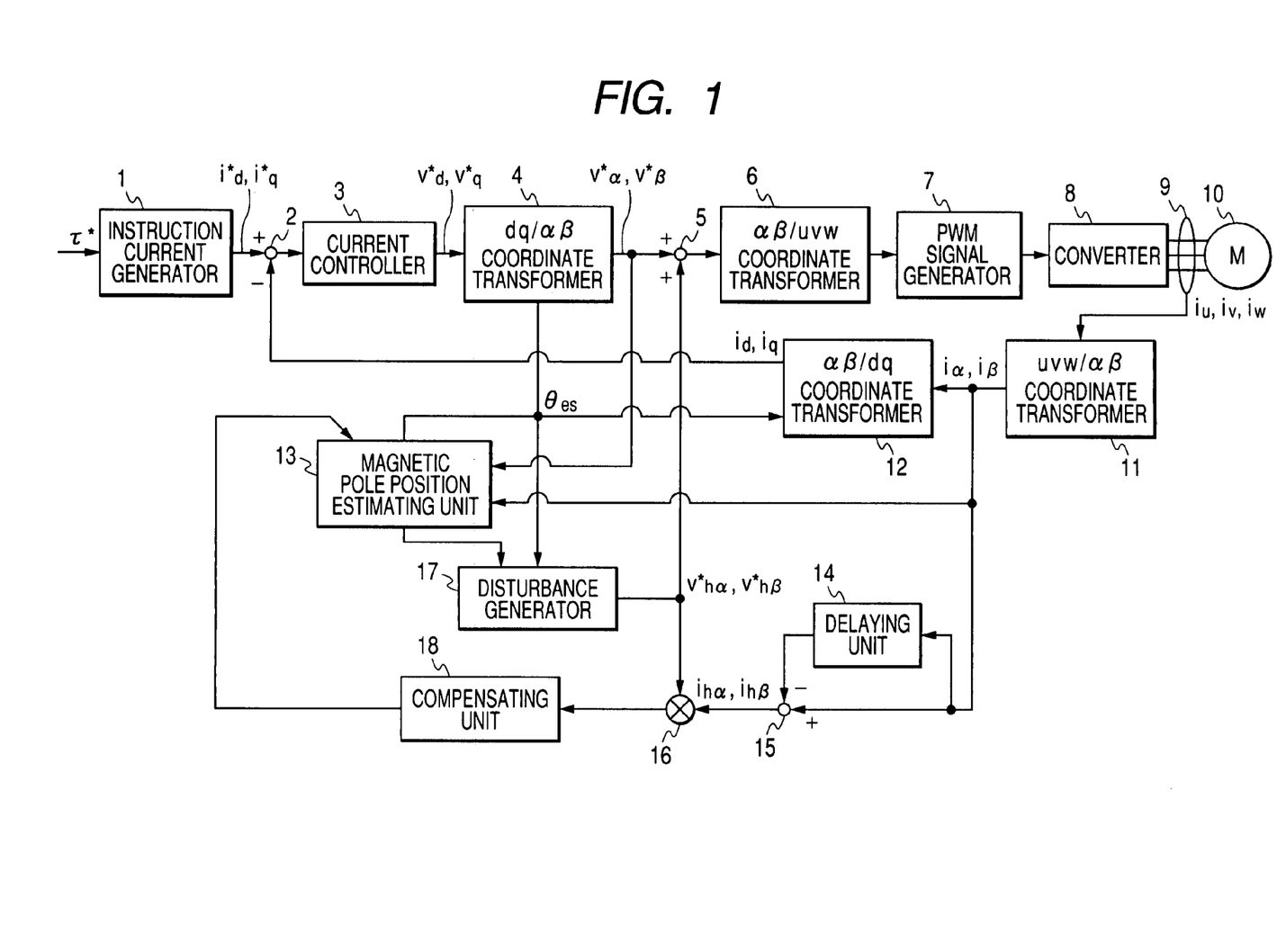
FIG. 1 is a block diagram of a control unit for a synchronous motor according to a first embodiment of the present invention.

FIG. 1 is a block diagram of a control unit for a synchronous motor according to a first embodiment of the present invention.

A synchronous motor 10 shown in FIG. 1 has windings of a stator and a rotor (not shown) made of permanent magnets. When a three-phase alternating current voltage is applied to the windings, a three-phase alternating current composed of phase currents of U, V and W phases flows through the windings so as to generate a changeable magnetic field due to electromagnetic induction, and the rotor having the permanent magnets is rotated on its rotation axis in response to the magnetic field. The rotational force is outputted through a transmitter such as a pulley and a belt. A phase of the current is controlled in a control unit shown in FIG. 1 to stably rotate the rotor at a desired rotational speed.

In this embodiment, permanent magnets having salient poles are disposed around a shaft of a rotor so as to be protruded from the shaft, so that a d-axis inductance $L_d$ of the motor along a d-axis direction from an observed S magnetic pole to a corresponding N magnetic pole in a dq rotational coordinates system is smaller than a q-axis inductance $L_q$ of the motor along a q-axis direction orthogonal to the d-axis direction on a plane perpendicular to the rotation axis.

As shown in FIG. 1, data of an instructed (or desired) rotational speed $\tau^*$ of the rotor is repeatedly given to an instruction current generator 1 of the control unit. Each time data of the speed $\tau^*$ is given to the control unit, the generator 1 calculates values of both a d-axis component $i_d^*$ and a q-axis component $i_q^*$ of an instructed alternating current $i^*$ defined in the dq rotational coordinates system from the speed $\tau^*$. In the dq rotational coordinates system, an original point is set at a position on the rotation axis. Because the dq coordinates system is a rotational system, voltage and current are, respectively, expressed by a direct current and a direct current voltage on the dq coordinates system. Therefore, the dq coordinates system represents a two-phase direct current coordinates system.

A first difference calculator 2 calculates a d-axis difference $\Delta i_d$ between the d-axis component $i^*_d$ and a d-axis component $i_d$ of a detected current $i_{det}$ and calculates a q-axis difference $\Delta i_q$ between the q-axis component $i^*_q$ and a q-axis component $i_q$ of the detected current $i_{det}$. The current is detected from the stator windings of the motor 10. A current controller 3 calculates values of both a d-axis component $V^*_d$ and a q-axis component $V^*_q$ of an instructed voltage $V^*$ from the differences $\Delta i_d$ and $\Delta i_q$ such that each of the differences $\Delta i_d$ and $\Delta i_q$ approaches zero when the instructed voltage is applied to the motor 10. The frequency of the instructed voltage $V^*$ is the same as that of the instructed current $i^*$.

A dq/αβ coordinate transformer 4 transforms the dq rotational coordinates system into an αβ coordinates system, based on an estimated magnetic pole position $\theta_{es}$ of the rotor, to convert the components $V^*_d$ and $V^*_q$ of the instructed voltage $V^*$ into an α-axis component $V^*_\alpha$ and a β-axis component $V^*_\beta$ defined in the αβ coordinates system. The position $\theta_{es}$ is expressed by a rotational angle of the rotor.

As is well-known, the αβ coordinates system is a stationary system and is defined by an α-axis and a β-axis orthogonal to each other on a plane perpendicular to the rotation axis of the rotor, and an original point of the αβ coordinates system is set on the rotation axis of the rotor to be the same position as that of the dq coordinates system. Because the αβ coordinates system is a stationary system, voltage and current are, respectively, expressed by an alternating current and an alternating current voltage on the αβ coordinates system. Therefore, the αβ coordinates system represents a two-phase alternating current coordinates system.

An estimated magnetic pole position is expressed on the αβ coordinates system by an angle between a direction of an estimated magnetic pole position and the α-axis. In this case, a true magnetic pole position $\theta_c$ is expressed by an angle between a direction of a true magnetic pole position (i.e., d-axis) and the α-axis. When a magnetic pole position of the rotor is correctly estimated so as to indicate the true position, a relative relation in phase (i.e., an angle between the α-axis and the d-axis) between the αβ stationary coordinates system and the dq rotational coordinates system can be specified. Therefore, the coordinate transformation can be correctly performed based on the estimated position $\theta_{es}$.

An adder 5 adds a phase matching voltage $V^*_h$ having an α-axis component $V^*_{h_\alpha}$ and a β-axis component $V^*_{h_\beta}$ to the instructed voltage $V^*$ outputted from the transformer 4 to produce a superimposed instruction voltage having an α-axis component $V^*_{h_\alpha}+V^*_\alpha$ and a β-axis component $V^*_{h_\beta}+V^*_\beta$. A frequency of the phase matching voltage is higher than a frequency of the instructed voltage $V^*$. For example, the phase matching voltage has a higher harmonic wave of a harmonic frequency, while the instructed voltage has a fundamental wave of a fundamental frequency. The harmonic frequency is integral times the fundamental frequency.

An αβ/uvw coordinate transformer 6 transforms the αβ coordinates system into a UVW coordinates system defined by a U-phase axis, a V-phase axis and a W-phase axis to convert the components $V^*_{h_\alpha}+V^*_\alpha$ and $V^*_{h_\beta}+V^*_\beta$ of the superimposed instruction voltage into a U-phase component $V^*u$, a V-phase component $V^*v$ and a W-phase component $V^*w$. The three axes of the UVW coordinates system are spaced at equal intervals of 120 degrees in electrical angle on the plane perpendicular to the rotation axis and correspond to U, V and W phases, and an original point of the UVW coordinates system is set to be the same as that of the αβ coordinates system.

A pulse width modulation (PWM) signal generator 7 generates a PWM signal from each of the components $V^*u$, $V^*v$ and $V^*w$ of the superimposed instruction voltage. The PWM signals are, respectively, transmitted to an inverter 8 to operate three switching elements corresponding to the stator windings. Therefore, the components $V^*u$, $V^*v$ and $V^*w$ of the superimposed instruction voltage are applied to the windings, respectively. In response to the superimposed instruction voltage, a three-phase alternating current having a U-phase component $i_u$, a V-phase component $i_v$ and a W-phase component $i_w$ flows through the windings. Further, the motor 10 generates an induced voltage depending on a magnetic pole position. Therefore, the alternating current depends on the superimposed instruction voltage and the induced voltage.

A current sensor 9 detects values of the phase components $i_u$, $i_v$ and $i_w$ of the alternating current $i_{det}$. The sensor 9 may detect only two of the three component values to calculate the other component value from the detected values. A uvw/αβ coordinate transformer 11 transforms the UVW coordinates system into the αβ coordinates system to convert the components $i_U$, $i_V$ and $i_W$ of the detected alternating current $i_{det}$ to an α-axis component $i_\alpha$ and a β-axis component $i_\beta$. This current includes a rotor driving current generated from the instructed voltage and a phase matching current generated from the phase matching voltage. The rotor driving current has the same frequency as that of the instructed voltage, and the phase matching current has the same frequency as that of the phase matching voltage. The detected alternating current is received in an αβ/dq coordinate transformer 12 and a magnetic pole position estimating unit 13.

The transformer 12 transforms the αβ coordinates system into the dq coordinates system, based on the estimated magnetic pole position $\theta_{es}$ outputted from the estimating unit 13, to convert the component $i_\alpha$ and $i_\beta$ of the detected alternating current into a d-axis component $i_d$ and a q-axis component $i_q$. The components $i_d$ and $i_q$ of the detected current are transmitted to the calculator 2. Here, the frequency of the phase matching current included in the detected current is higher than that of the instructed current generated in the generator 1, while the driving current included in the detected current has the same frequency as that of the instructed current. Therefore, the phase matching current hardly exerts influence on the calculation of the calculator 2.

The estimating unit 13 estimates a magnetic pole position $\theta_{es}$ of the rotor according to a motor model expression wherein the components $V^*_\alpha$ and $V^*_\beta$ of the instructed voltage received from the transformer 4, the components $i_\alpha$ and $i_\beta$ of the detected current received from the transformer 11 and parameters are used. This motor model expression is obtained by applying a disturbance observer to a motor model considering an extended induced voltage. The disturbance observer is, for example, disclosed in a paper of "Position and Speed Sensorless Control of IPMSM Using Extended Induced Voltage Disturbance Observer" written by Ichikawa, Chin, Tomita, Michiki and Ookuma, in the meeting of industrial applied section in 2000, the Institute of Electrical Engineer of Japan (IEEJ).

The model considering an extended induced voltage is expressed in the $\alpha\beta$ coordinates system according to a first formula:

$$\begin{bmatrix} V_\alpha \\ V_\beta \end{bmatrix} = \begin{bmatrix} R + pL_d & \omega_{re}(L_d - L_q) \\ -\omega_{re}(L_d - L_q) & R + pL_d \end{bmatrix} \begin{bmatrix} i_\alpha \\ i_\beta \end{bmatrix} + \{(L_d - L_q)(\omega_{reid} - i_q) + \omega_{re}K_E\} \begin{bmatrix} -\sin\theta_{re} \\ \cos\theta_{re} \end{bmatrix}$$

by using both an $\alpha$-axis component $V_\alpha$ and a $\beta$-axis component $V_\beta$ of an instructed voltage applied to a motor, a resistance R of a stator, a rotational speed $\omega_{re}$ of a rotor obtained by differentiating a position of the rotor estimated at a previous estimation cycle with respect to time, a d-axis inductance $L_d$ in the motor, a q-axis inductance $L_q$ in the motor, a differential operator p, both an $\alpha$-axis component $i_\alpha$ and a $\beta$-axis component $i_\beta$ of a driving current detected from the motor, and a constant $K_E$ of an induced voltage.

In this model expression, the second term of the right side is defined as an extended induced voltage. In addition to an induced voltage based on permanent magnets of the rotor, an inductance difference $L_d - L_q$ generating a reluctance torque is considered as a component of an additional magnetic flux. A magnetic pole position can be easily estimated by using this model. When a disturbance observer regarding an extended induced voltage as disturbance is constituted based on this model, an extended induced voltage can be calculated. Both an $\alpha$-axis component $e_\alpha$ and a $\beta$-axis component $e_\beta$ of the extended induced voltage are expressed according to a second formula:

$$\begin{bmatrix} e_\alpha \\ e_\beta \end{bmatrix} = \frac{s}{s+\alpha} \left\{ \begin{bmatrix} V_\alpha \\ V_\beta \end{bmatrix} - \begin{bmatrix} R + pL_d & \omega_{re}(L_d - L_q) \\ -\omega_{re}(L_d - L_q) & R + pL_d \end{bmatrix} \begin{bmatrix} i_\alpha \\ i_\beta \end{bmatrix} \right\}$$

by additionally using a differential operator s and an observer pole $\alpha$.

Because the relation of $\tan\theta_{es} = -e_\alpha/e_\beta$ is satisfied by considering a voltage vector advanced by 90 degrees from a direction of a magnetic flux (i.e., direction of estimated magnetic pole position), the estimated position $\theta_{es1}$ is obtained by an arctangent calculation according to a third formula.

$$\theta_{es} = \tan^{-1} \frac{-e_\alpha}{e_\alpha}$$

In this estimation, the induced voltage is calculated according to the detailed motor model. Therefore, even though a rotational speed of the rotor or a load added to the rotor is rapidly changed, the magnetic pole position of the rotor can be correctly estimated from the induced voltage $e(e_\alpha, e_\beta)$. However, because this motor model includes a differential term $s/(s+\alpha)$, an amount of calculation required for the estimation is enormously increased. To reduce the amount of calculation, an approximate motor model not including any differential term may be used for estimation of a magnetic pole position.

More specifically, a wave height $Ia(t)$ of both the $\alpha$-axis component $i_\alpha$ ($i_\alpha = -Ia(t) \cdot \sin\theta$, $\theta = \omega_{re}t + c$, c is a constant) and the $\beta$-axis component $i_\beta$ ($i_\beta = Ia(t) \cdot \cos\theta$) in the driving current is changed with time. This time depending wave height $Ia(t)$ is approximated to or replaced with a wave height $Ia$ substantially not depending on time t ($d/dt \cdot Ia \approx 0$). That is, a differentiated value of a wave height of the driving current with respect to time is substantially set at zero (step S12). In this case, a differential term for the $\alpha$-axis component $i_\alpha$ in the motor model can be rewritten according to a fourth formula.

$$\begin{aligned} pL_d \cdot i_\alpha &= L_d \frac{d}{dt} \cdot i_\alpha \\ &= L_d \left( -\frac{d}{dt} \cdot I_a \sin\theta - I_a \frac{d}{dt} \cdot \sin\theta \right) \\ &= -L_d \cdot I_a \frac{d}{dt} \cdot \sin\theta \\ &= -L_d \cdot \omega_{re} \cdot I_a \cdot \cos\theta \\ &= -L_d \cdot \omega_{re} \cdot i_\beta \end{aligned}$$

In the same manner, a differential term for the $\beta$-axis component $i_\beta$ in the motor model can be rewritten according to a fifth formula.

$$pL_d \cdot i_\beta = L_d \cdot \omega_{re} \cdot i_\alpha$$

Therefore, the second formula can be simplified and rewritten, and a sixth formula expressing an approximate motor model is obtained by inserting the fourth and fifth formulas to the second formula.

$$\begin{bmatrix} e_\alpha \\ e_\beta \end{bmatrix} = \begin{bmatrix} V^*_\alpha \\ V^*_\beta \end{bmatrix} - \begin{bmatrix} R & -\omega_{re}L_q \\ \omega_{re}L_q & R \end{bmatrix} \begin{bmatrix} i_\alpha \\ i_\beta \end{bmatrix}$$

The components $e_\alpha$ and $e_\beta$ of the induced voltage are calculated from the components $V^*_\alpha$ and $V^*_\beta$ of the instructed voltage and the components $i_\alpha$ and $i_\beta$ of the driving current by using parameters such as a stator resistance R, a rotational speed $\omega_{re}$ and a q-axis inductance Lq. The estimated position $\theta_{es}$ is obtained from the components $e_\alpha$ and $e_\beta$ of the induced voltage according to the third formula. The estimated position $\theta_{es}$ is outputted to the transformers 4 and 12 and a disturbance generator 17. Here, because the frequency of the phase matching voltage and current is higher than that of the instructed voltage and driving current, the phase matching voltage and current exert no influence on the estimation in the unit 13.

When the parameters are constant regardless of operation conditions of a motor or sizes and shapes of parts of motors in the mass production, a magnetic pole position substantially matching with a true magnetic pole position (i.e., d-axis) can be estimated in the unit 13. However, values of the parameters appropriate to the motor 10 are varied due to various causes such as a change in operation conditions and variations in sizes and shapes of parts of motors. Therefore, when all parameter values are set to be constant, the position $\theta_{es}$ matching with a true magnetic pole position cannot be correctly estimated.

To solve this problem, a phase matching voltage of a higher harmonic wave is applied to the motor 10 in addition to the instructed voltage of a fundamental wave, and a phase matching current generated from the phase matching voltage is detected from the motor 10. The phase matching current has the same harmonic frequency as that of the phase matching voltage. When a phase of the phase matching current is shifted from that of the phase matching voltage, it is judged that at least one of the parameters differs from a value appropriate to the motor 10 so as to differentiate an estimated magnetic pole position from a true magnetic pole position. In response to this judgment, the parameter is corrected according to a difference in phase between the phase matching voltage and the phase matching current such that the phase difference substantially becomes zero. For example, the d-axis inductance $L_d$ is corrected.

The reasoning that the estimated magnetic pole position can approach the true magnetic pole position when the phase difference substantially becomes zero is described. In the motor 10 having salient-pole permanent magnets, the d-axis inductance $L_d$ is smaller than the q-axis inductance $L_q$. Therefore, when a magnetic field is induced in the stator windings, the flowing of an alternating current along the d-axis is easier than that along the q-axis. That is, impedance for the alternating current along the q-axis is larger than that along the d-axis. Therefore, when a vector of an instructed voltage applied to the motor 10 is not placed on the d-axis, a vector of a driving current generated from the instructed voltage is shifted toward the d-axis with respect to the vector of the instructed voltage.

The disturbance generator 17 generates data of an α-axis component $V^*_{h_\alpha}$ and a β-axis component $V^*_{h_\beta}$ of the phase matching voltage $V^*_h$ such that a phase of the phase matching voltage is the same as that of the estimated position $\theta_{es}$ previously obtained in the estimating unit 13. In the adder 5, the phase matching voltage is superimposed on the instructed voltage $V^*(V^*_\alpha, V^*_\beta)$. Therefore, a phase matching current generated from the phase matching voltage is included in the detected alternating current.

Figure 2:
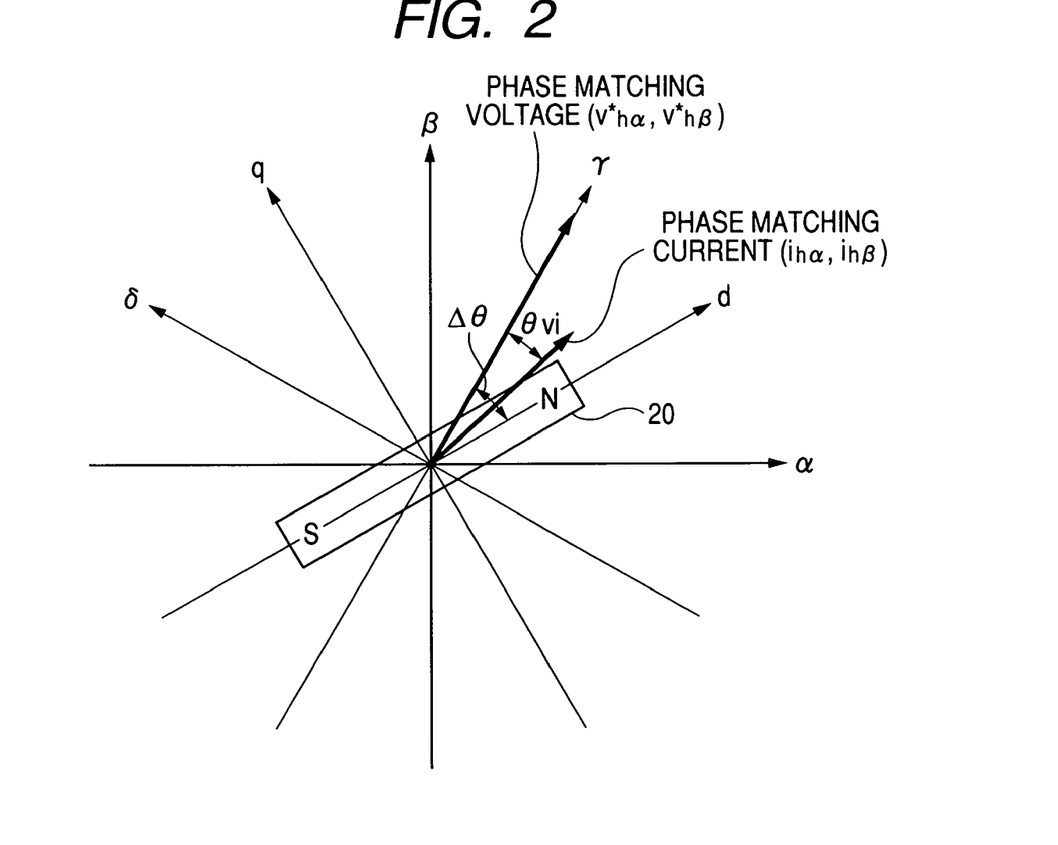
FIG. 2 shows a difference in phase between a phase matching voltage and a phase matching current.

FIG. 2 shows a difference in phase between the phase matching voltage and the phase matching current.

As shown in FIG. 2, when the estimated position $\theta_{es}$ differs from a true magnetic pole position (d-axis) a phase (indicated by γ-axis in FIG. 2) of the phase matching voltage differentiated from the d-axis corresponding to a true magnetic pole position. Because the flowing of an alternating current along the d-axis is easier than that along the q-axis, a phase of the phase matching current is shifted toward the d-axis with respect to the phase of the phase matching voltage. In the example shown in FIG. 2, when the phase of the phase matching voltage is advanced from the d-axis, the phase of the phase matching current is delayed from the phase of the phase matching voltage. In contrast, when the phase of the phase matching voltage is delayed from the d-axis, the phase of the phase matching current is advanced from the phase of the phase matching voltage. A phase difference θvi between the phase matching voltage and the phase matching current substantially becomes zero when the phase of the phase matching voltage accords or matches with the d-axis. Therefore, when at least one of the parameters in the approximate motor model expression is corrected such that the phase difference becomes almost zero, the estimated position can approach a true magnetic pole position.

To correct at least one of the parameters in the approximate motor model expression according to the phase difference such that the phase difference becomes almost zero, a delaying unit 14 holds the detected alternating current outputted from the transformer 11 for a predetermined period of time (e.g., period of time corresponding to one wavelength of the detected alternating current) to produce a delayed alternating current. A second difference calculator 15 subtracts the delayed alternating current from the detected alternating current outputted from the transformer 11. In this subtraction, the driving current included in the delayed alternating current cancels out that of the detected alternating current. Then, the calculator 15 performs a sampling operation at a cycle equal to the frequency of the phase matching voltage to extract an α-axis component $i_{h_\alpha}$ and a β-axis component $i_{h_\beta}$ of the phase matching current from the subtracted result without causing a phase delay in the phase matching current.

To extract the phase matching current from the detected alternating current, a high pass filter may be used in place of the delaying unit 14 and the calculator 15. In this case, because a phase delay occurs in the phase matching current, a phase compensation is needed for the phase matching current.

An outer product calculator 16 calculates a length of an outer product of the phase matching voltage $V(V^*_{h_\alpha}, V^*_{h_\beta})$ generated in the generator 17 and the phase matching current $I(i_{h_\alpha}, i_{h_\beta})$ produced in the calculator 15 according to a seventh formula.

$$V \times I = |V||I|\sin\theta_{vi} = V^*_{h_\alpha}i_{h_\beta} - V^*_{h_\beta}i_{h_\alpha}$$

In this formula, when the current I is advanced in phase from the voltage V, that is, when the estimated magnetic pole position $\theta_{es}$ is delayed from a true magnetic pole position $\theta_c$, the calculated length becomes positive. In contrast, when the current I is delayed in phase from the voltage V, that is, when the estimated magnetic pole position $\theta_{es}$ is advanced from a true magnetic pole position $\theta_c$, the calculated length becomes negative. $\theta_{vi}$ denotes a phase difference between vectors of V and I.

As compared with a case where a phase difference $\theta_{vi}$ is directly calculated by using complicated calculations such as arctangent calculation, only simple calculations such as multiplication and subtraction are required to calculate the outer produce. Therefore, an amount of calculation in the estimation of a magnetic pole position can be further reduced.

A length of the outer product becomes zero when the phase difference $\theta_{vi}$ is zero. When the phase difference $\theta_{vi}$ differs from zero, the outer product has a length of a plus or minus sign. Therefore, it is preferred that the length of the outer product is calculated as a value corresponding to the phase difference.

A compensating unit 18 corrects a value of the q-axis inductance $L_q$, based on the length of the outer product, while considering a sign of a length of the outer product, according to an eighth formula.

$$L_q = L_0 + K_p V \times I + K_i \int V \times I dt$$

$L_0$ denotes an initial value. $K_p$ denotes a proportion gain. $K_i$ denotes an integration gain. Therefore, the q-axis inductance $L_q$ can be reliably corrected such that an outer product calculated based on the corrected inductance $L_q$ substantially becomes zero.

The estimating unit 13 estimates the magnetic pole position, based on the corrected inductance $L_q$, according to the second formula. Therefore, because the corrected inductance $L_q$ is determined in the unit 18 such that the outer product substantially becomes zero, the estimated magnetic pole position $\theta_{es}$ can be determined such that the phase difference substantially becomes zero, and the estimated magnetic pole position $\theta_{es}$ can substantially match with a true magnetic pole position $\theta_c$.

In conclusion, in this embodiment, when a magnetic pole position in the motor 10 is estimated from an instructed voltage applied to the motor, a current generated from the voltage and parameters according to the approximate motor model expression, a phase matching voltage, of which a phase matches with the estimated magnetic pole position calculated at a first cycle, is applied to the motor, a phase matching current generated from the phase matching voltage is detected from the motor, and a value of at least one of the parameters is corrected such that a difference in phase between the phase matching voltage and the phase matching current substantially becomes zero. Therefore, when a magnetic pole position is estimated at a second cycle succeeding to the first cycle from the instructed voltage, the generated current and the parameters including the parameter of the corrected value, a phase of the instructed voltage can be controlled based on the estimated magnetic pole position substantially matching with a true magnetic pole position.

Accordingly, an operation of the motor 10 can be reliably controlled, and an amount of calculation for estimating a magnetic pole position substantially matching with a true magnetic pole position can be considerably reduced.

Further, because the phase matching current generated from the phase matching voltage flows through the stator windings of the motor 10, magnetic saturation requiring sufficient current can be reliably obtained in the motor 10. Therefore, the motor can be reliably driven.

The frequency of the phase matching voltage may be ranged from 300 Hz to 10 KHz. However, when the frequency of the phase matching voltage is not sufficiently higher than that of the instructed voltage, there is a probability that pulsation occurs such that the value of the instructed voltage fluctuates or noises of a low audio frequency are generated. In contrast, when the frequency of the phase matching voltage is excessively high, it becomes difficult to extract the phase matching current from the detected alternating current. Therefore, when pulsation or noises are allowed during the operation of the motor 10, the frequency of the phase matching voltage is preferably ranged from 300 to 700 Hz. When a unit of a higher performance is used to extract the phase matching current, the frequency of the phase matching voltage is preferably ranged from 5 to 10 KHz.

In this embodiment, a frequency of the phase matching voltage having a harmonic wave is integral times (twice, or third times, - - - ) that of the instructed voltage having a fundamental wave. However, the phase matching voltage may have a frequency higher than that of the instructed voltage.

Further, the compensating unit 18 calculates a corrected value of the q-axis inductance $L_q$. However, when the length of the outer product is positive, the estimated magnetic pole position $\theta_{es}$ is delayed from a true magnetic pole position $\theta_c$. In contrast, when the length of the outer product is negative, the estimated magnetic pole position $\theta_{es}$ is advanced from a true magnetic pole position $\theta_c$. Therefore, it can be judged based on a sign of the length of the outer product whether the estimated magnetic pole position $\theta_{es}$ is advanced or delayed from a true magnetic pole position $\theta_c$. Therefore, the unit 18 may increase or decrease the q-axis inductance $L_q$ by a predetermined value, based on a sign of the length of the outer product such that the phase difference approaches zero.

First Modification of First Embodiment

In the first embodiment, the phase matching voltage $V^*_h(V^*_{h_\alpha}, V^*_{h_\beta})$ and the phase matching current $i_h(i_{h_\alpha}, i_{h_\beta})$ are defined in the $\alpha\beta$ stationary coordinates system. However, a magnetic pole position may be estimated such that an outer product of a phase matching voltage and a phase matching current defined in the dq rotational coordinates system substantially becomes zero.

Figure 3:
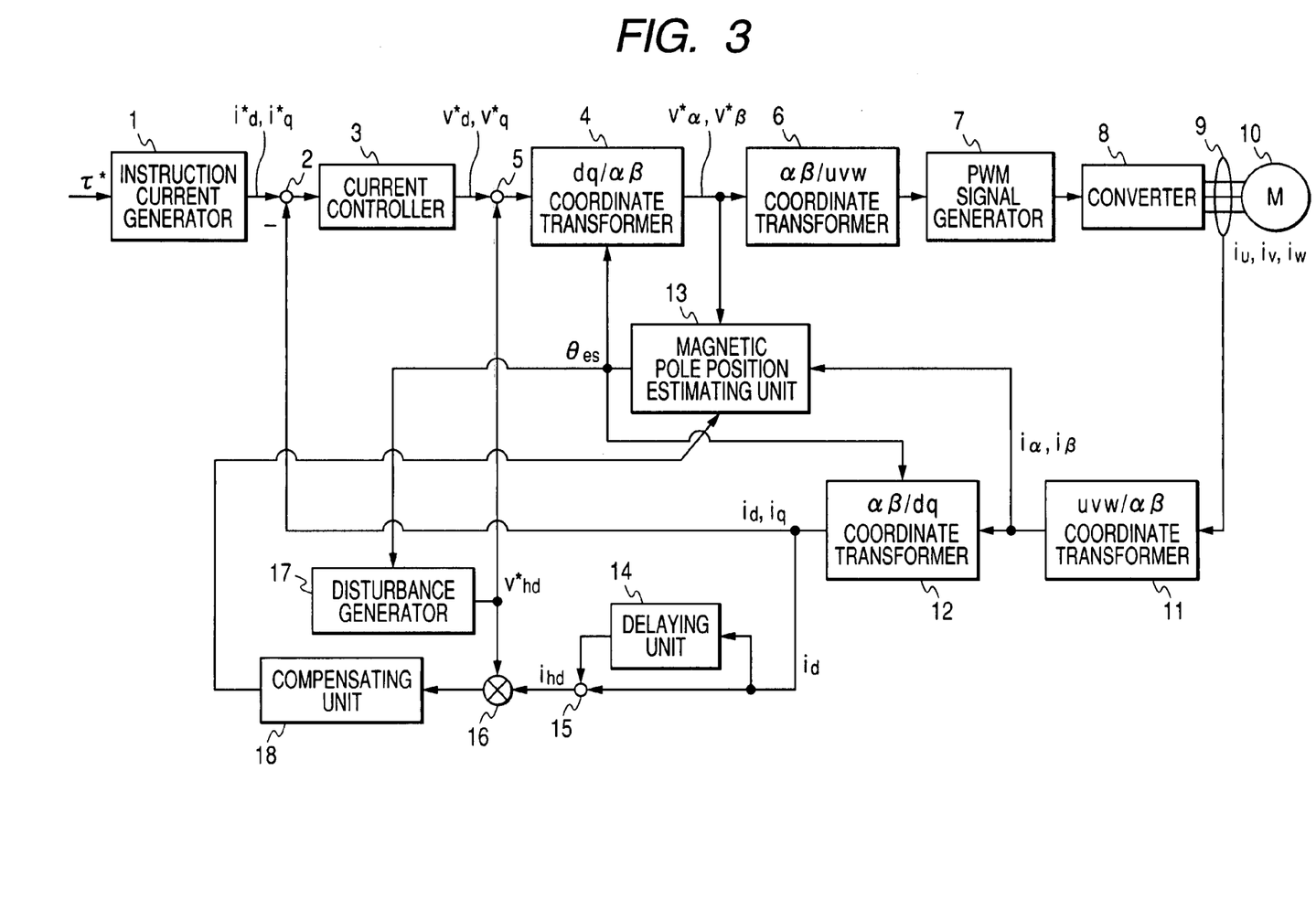
FIG. 3 is a block diagram of a control unit for a synchronous motor according to a modification of the first embodiment.

FIG. 3 is a block diagram of a control unit for a synchronous motor according to a first modification of the first embodiment.

As shown in FIG. 3, the disturbance generator 17 generates a d-axis component $V^*_{hd}$ of a phase matching voltage such that a phase of the phase matching voltage matches with that of the estimated position $\theta_{es}$. Because the position $\theta_{es}$ correctly estimated substantially matches with a true position $\theta_c$ placed on the d-axis, the phase matching voltage is generated such that the phase of the phase matching voltage matches with the d-axis. That is, the phase matching voltage has a q-axis component value substantially equal to zero. The adder 5 adds the phase matching voltage ($V^*_{hd}$, 0) to the instructed voltage $V^*(V^*d, V^*_q)$ outputted from the controller 3 to produce a superimposed instruction voltage. The transformer 4 converts components of the superimposed instruction voltage into $\alpha$- and $\beta$-axes components, and the transformer 6 transforms these components into U-, V- and W-axes components.

The delaying unit 14 delays a detected alternating current $i_{det}(i_d, i_q)$ produced in the former 12, and the calculator 15 subtracts the delayed alternating current from the detected alternating current outputted from the transformer 12 to extract a phase matching current $i_h(i_{hd}, i_{hq})$ from the detected alternating current. The calculator 16 calculates a length of an outer product of the phase matching voltage $V_h(V^*_{hd}, 0)$ and the phase matching current $i_h(i_{hd}, i_{hq})$. The compensating unit 18 corrects a value of the q-axis inductance $L_q$, based on the length of the outer product, such that an outer product calculated based on the corrected inductance $L_q$ becomes substantially zero, and the estimating unit 13 estimates a magnetic pole position, based on the q-axis inductance $L_q$ set at the corrected value.

Because the phase matching voltage has a q-axis component value substantially equal to zero, calculation of the outer product can further become easy.

Second Modification of First Embodiment

An applied phase matching current having only a d-axis component may be superimposed on the d-axis difference Δi_d outputted from the calculator 2. In this case, the disturbance generator 17 generates the phase matching current having the same phase as that of an estimated magnetic pole position which substantially matches with a true magnetic pole position. The controller 3 converts the phase matching current into a phase matching voltage having the same phase as the phase matching current. The phase matching voltage is applied to the motor 10, and the calculator 15 extracts a phase matching current $i_h(i_{hd}, i_{hq})$ generated from the applied phase matching current from the detected alternating current.

Therefore, the phase matching voltage superimposed on the instructed voltage is substantially applied to the motor, and the q-axis inductance $L_q$ can be corrected such that an outer product of the applied phase matching current and the phase matching current substantially becomes zero.

Embodiment 2

Figure 4:
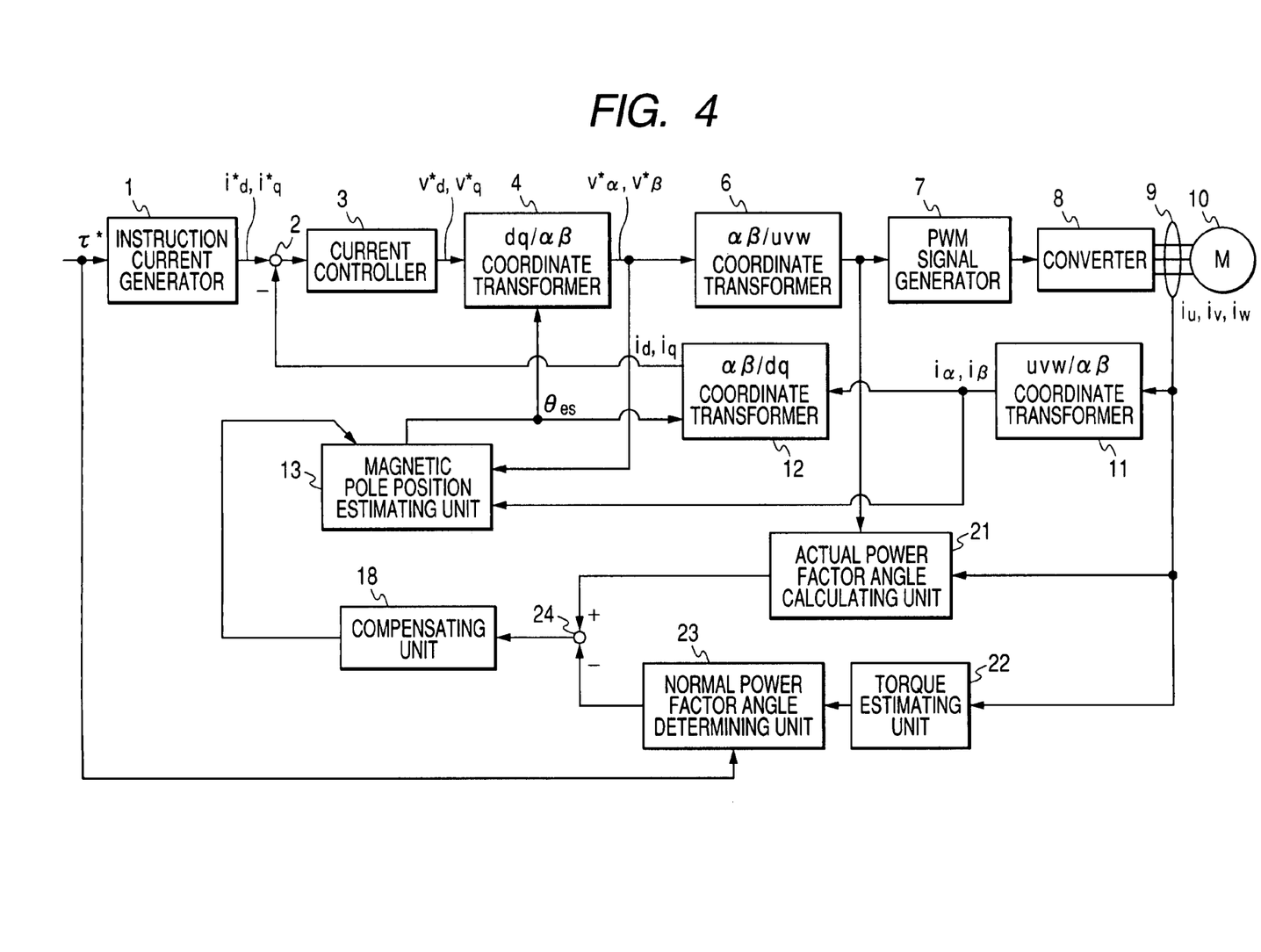
FIG. 4 is a block diagram of a control unit for a synchronous motor according to a second embodiment of the present invention.
Figure 5A:
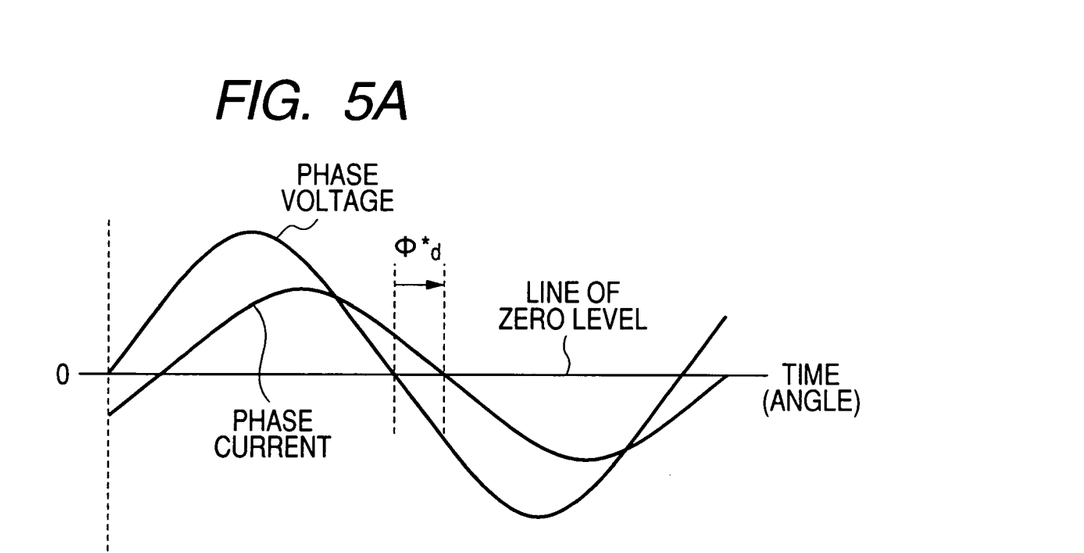
FIG. 5A shows a phase current shifted in phase from a phase voltage by a normal power factor angle.
Figure 6:
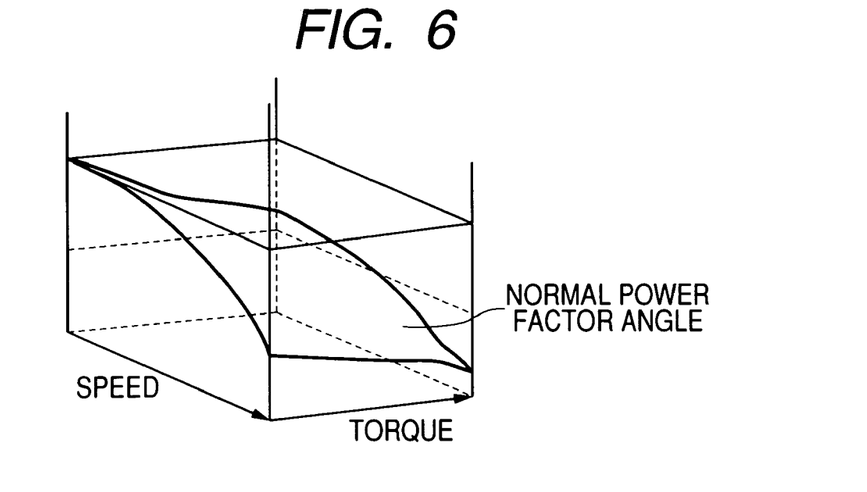
FIG. 6 shows a two-dimensional map indicating a relation between a normal power factor angle and a combination of rotational speed and torque.
Figure 7:
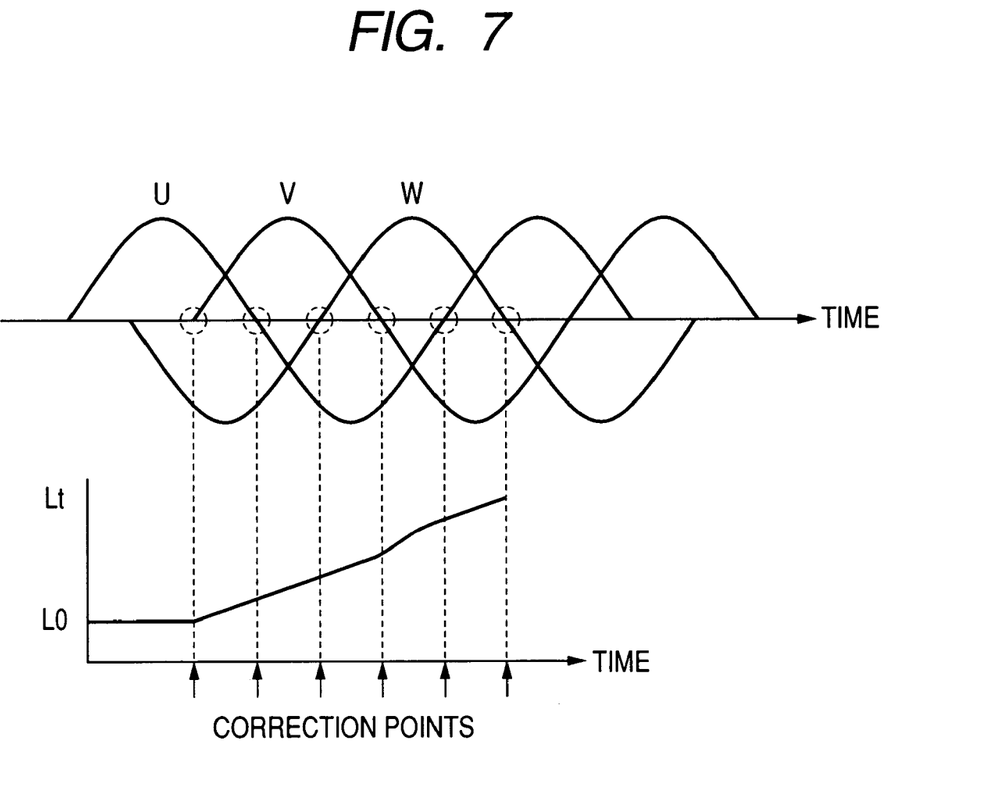
FIG. 7 shows a q-axis inductance $L_q$ corrected each time one of three phase currents crosses a zero level line.

FIG. 4 is a block diagram of a control unit for a synchronous motor according to a second embodiment of the present invention. FIG. 5A shows a phase current shifted in phase from a phase voltage by a normal power factor angle, and FIG. 5A shows a phase current shifted in phase from a phase voltage by an actual power factor angle. FIG. 6 shows a two-dimensional map indicating a relation between a normal power factor angle and a combination of rotational speed and torque. FIG. 7 shows a q-axis inductance $L_q$ corrected each time one of three phase currents crosses a zero level line.

A synchronous motor 40 shown in FIG. 4 differs from the motor 10 shown in FIG. 1 in that the motor 40 has a rotor (not shown) made of permanent magnets having salient poles or non-salient poles.

As shown in FIG. 4, a torque estimating unit 22 estimates a torque of the rotor of the motor 10, based on the phase currents $i_u$, $i_v$ and $i_w$ of the three-phase current detected in the sensor 9. A normal power factor angle determining unit 23 determines a normal power factor angle from both the instructed rotational speed τ* of the rotor and the estimated torque.

As shown in FIG. 5A, a power factor angle is defined as a phase difference between a phase voltage of a three-phase voltage applied to a motor and a phase current of a three-phase current generated from the applied three-phase voltage. The phase difference is obtained from a difference in zero level crossing time between the phase current and the phase voltage. When a magnetic pole position estimated in the estimating unit 13 matches with a true magnetic pole position, the power factor angle is minimized and reaches a normal power factor angle φ*d. A power factor of the motor is determined from both a rotational speed and torque of a rotor of the motor and is maximized when the phase difference is the same as the normal power factor angle φ*d.

The determining unit 23 stores a two-dimensional map shown in FIG. 6. This map indicates a relation between a normal power factor angle and a combination of rotational speed and torque. When receiving the speed τ* and the estimated torque, the unit 23 refers to the map and detects a normal power factor angle set at a value which corresponds to an operation point of the motor 10 determined by the combination of the speed τ* and the estimated torque.

An actual power factor angle calculating unit 21 receives the phase voltages V*u, V*v and V*w of the three-phase instructed voltage and the phase currents $i_u$, $i_v$ and $i_w$ of the three-phase detected current from the transformer 6 and the sensor 9 and calculates a phase difference between each phase voltage and the corresponding phase current each time the phase current crosses a line of the zero level, and calculates an average phase difference from the phase differences. The unit 21 outputs the average phase difference as an actual power factor angle to a second difference calculator 24.

The actual power factor angle may be calculated according to a technique disclosed in Published Japanese Patent First Publication No. 2004-64860 or Published Japanese Patent First Publication No. 2004-88838. More specifically, an integration range of time is determined based on adjacent times that each of three phase currents $i_u$, $i_v$ and $i_w$ repeatedly crosses a line of the zero level, each of applied phase voltages is integrated in the corresponding integration range, and the actual power factor angle is calculated from an integration value ranging between zero and a maximum value.

Figure 5B:
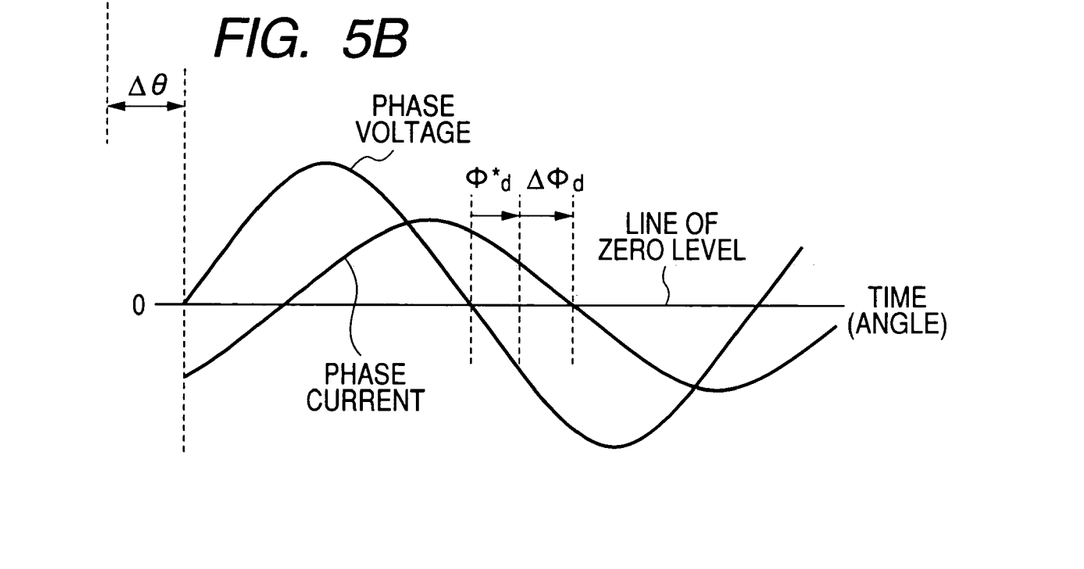
FIG. 5B shows a phase current shifted in phase from a phase voltage by an actual power factor angle.

As shown in FIG. 5B, when a magnetic pole position estimated in the unit 13 differs from a true magnetic pole position by a position difference Δθ, the actual power factor angel becomes larger than the normal power factor angle φ*d by an angle difference Δφd corresponding to the position difference Δθ.

The control unit shown in FIG. 4 controls a phase of a voltage applied to stator windings of the motor 10 in synchronization with a position (e.g., magnetic pole position) of the rotor 20. Therefore, when an estimated magnetic pole position differs from a true magnetic pole position, the actual power factor angle is differentiated from the normal power factor angle.

The calculator 24 subtracts the normal power factor angle φ*d from the actual power factor angle to obtain the angle difference Δφd. A compensating unit 25 corrects a value of the q-axis inductance $L_q$ based on the angle difference Δφd, such that an actual power factor angle calculated based on the corrected inductance $L_q$ substantially coincides with the normal power factor angle. The estimating unit 13 estimates a magnetic pole position, based on the corrected inductance $L_q$.

For example, as shown in FIG. 7, each time one of the phase currents $i_u$, $i_v$ and $i_w$ crosses a line of the zero level, the inductance $L_q$ is corrected, and a magnetic pole position is estimated based on the corrected inductance $L_q$. In this case, even though an original value Lo of the inductance $L_q$ largely differs from a value Lt appropriate to the motor 40, the value of the inductance $L_q$ can gradually approach the appropriate value Lt by repeatedly performing the correction and estimation. Therefore, a magnetic pole position substantially matching with the true magnetic pole position can be reliably estimated.

In conclusion, in this embodiment, when a magnetic pole position in the motor 40 is estimated from an instructed voltage determined from an instructed rotational speed of the rotor and applied to the motor, a current generated from the voltage and parameters according to the approximate motor model expression, an actual power factor angle is calculated from a difference in phase between the instructed voltage and the generated current, a normal power factor angle is calculated from the instructed rotational speed and a torque of the rotor estimated from the generated current, and a value of at least one of the parameters is corrected such that the actual power factor angle substantially coincides with the normal power factor angle. Therefore, when a magnetic pole position is estimated at a next cycle from the instructed voltage, the generated current and the parameters including the parameter of the corrected value, a phase of the instructed voltage can be controlled based on the estimated magnetic pole position substantially matching with a true magnetic pole position.

Accordingly, in the same manner as in the first embodiment, an amount of calculation for estimating a magnetic pole position substantially matching with a true magnetic pole position can be considerably reduced.

What is claimed is:

1. A method of estimating a magnetic pole position in a synchronous motor having salient poles, comprising the steps of:
   providing a motor model expression for estimating the magnetic pole position from an instructed voltage applied to the motor, a current generated from the instructed voltage and a parameter; and
   calculating an estimated magnetic pole position in the motor from the instructed voltage, the generated current and the parameter according to the motor model expression, wherein the step of calculating the estimated magnetic pole position comprises:
   applying, to the motor, a phase matching voltage which has a frequency higher than that of the instructed voltage and has a phase matching with the estimated magnetic pole position previously obtained;
   detecting a phase matching current generated from the phase matching voltage from the motor;
   correcting a value of the parameter such that a difference in phase between the phase matching voltage and the phase matching current substantially becomes zero, and
   calculating an estimated magnetic pole position from the instructed voltage, the generated current and the parameter having the corrected value.

2. The method according to claim 1, wherein the step of correcting the value of the parameter includes determining a corrected value of the parameter such that an outer product of a vector of the phase matching voltage derived from the corrected value of the parameter and a vector of the phase matching current substantially becomes zero.

3. The method according to claim 2, wherein the corrected value of the parameter is calculated from the outer product.

4. The method according to claim 2, wherein the step of determining the corrected value of the parameter includes:
   repeatedly increasing or decreasing the value of the parameter by a predetermined value in response to a sign of the outer product, which is derived from the increased or decreased value of the parameter, until the outer product substantially becomes zero.

5. The method according to claim 1, wherein the phase matching voltage has a harmonic frequency which is integral times a frequency of the instructed voltage.

6. The method according to claim 1, wherein the phase matching voltage is defined in a two-phase alternating current coordinates system.

7. The method according to claim 1, wherein the phase matching voltage is defined in a two-phase direct current coordinates system.

8. A method of estimating a magnetic pole position of a rotor in a synchronous motor, comprising the steps of:
   providing a motor model expression for estimating the magnetic pole position from an instructed voltage determined from an instructed rotational speed of the rotor and applied to the motor, a current generated from the instructed voltage and a parameter; and
   calculating an estimated magnetic pole position in the motor from the instructed voltage, the generated current and the parameter according to the motor model expression, wherein the step of calculating the estimated magnetic pole position comprises:
   calculating an actual power factor angle from a difference in phase between the instructed voltage and the generated current;
   calculating a normal power factor angle from the instructed rotational speed and a torque of the rotor, the normal power factor angle being defined as a power factor angle obtained when the estimated magnetic pole position matches with a true magnetic pole position;
   correcting a value of the parameter such that the actual power factor angle substantially coincides with the normal power factor angle; and
   calculating an estimated magnetic pole position from the instructed voltage, the generated current and the parameter having the corrected value.

9. The method according to claim 8, wherein the step of calculating the normal power factor angle includes:
   storing a relation map between the normal power factor angle and a combination of both a rotational speed and a torque; and
   determining the normal power factor angle set at a value corresponding to a combination of the instructed rotational speed and the torque of the rotor by referring to the relation map.

10. The method according to claim 8, wherein the step of calculating the normal power factor angle includes:
    estimating the torque of the rotor from the generated current.

11. An apparatus of controlling a synchronous motor having salient poles, comprising:
    an estimating unit which estimates a magnetic pole position in the motor from an instructed voltage applied to the motor, a current generated from the instructed voltage and a parameter; and
    a control unit which controls the motor according to the estimated magnetic pole position,
    wherein the estimating unit has:
    an applying unit which applies, to the motor, a phase matching voltage which has a frequency higher than that of the instructed voltage and has a phase matching with the estimated magnetic pole position previously obtained;
    a detecting unit which detects a phase matching current generated from the phase matching voltage from the motor;
    a correcting unit which corrects a value of the parameter such that a difference in phase between the phase matching voltage and the phase matching current substantially becomes zero; and
    a calculating unit which calculates an estimated magnetic pole position from the instructed voltage, the detected current and the parameter having the corrected value, and
    the control unit controls the motor according to the estimated magnetic pole position calculated in the calculating unit.

12. The apparatus according to claim 11, wherein the correcting unit corrects a value of the parameter such that an outer product of a vector of the phase matching voltage derived from the corrected value of the parameter and a vector of the phase matching current substantially becomes zero.

13. The apparatus according to claim 11, wherein the phase matching voltage has a harmonic frequency which is integral times a frequency of the instructed voltage.

14. An apparatus of controlling a synchronous motor, comprising:

an estimating unit which estimates a magnetic pole position of a rotor in the motor from an instructed voltage determined from an instructed rotational speed of the rotor and applied to the motor, a current generated from the instructed voltage and a parameter; and a control unit which controls the motor according to the estimated magnetic pole position, wherein the estimating unit has:

a first calculator which calculates an actual power factor angle from a difference in phase between the instructed voltage and the generated current;

a second calculator which calculates a normal power factor angle from the instructed rotational speed and a torque of the rotor, the normal power factor angle being defined as a power factor angle obtained when the estimated magnetic pole position matches with a true magnetic pole position;

a correcting unit which corrects a value of the parameter such that the actual power factor angle substantially coincides with the normal power factor angle; and a third calculator which calculates an estimated magnetic pole position from the instructed voltage, the generated current and the parameter having the corrected value.

15. The apparatus according to claim 14, wherein the second calculator is configured to store a relation map between the normal power factor angle and a combination of both a rotational speed and a torque, and to determines the normal power factor angle set at a value corresponding to a combination of the instructed rotational speed and the torque of the rotor by referring to the relation map.

* * * * *

UNITED STATES PATENT AND TRADEMARK OFFICE
CERTIFICATE OF CORRECTION

PATENT NO. : 7,352,151 B2
APPLICATION NO. : 11/525139
DATED : April 1, 2008
INVENTOR(S) : Masami Fujitsuna and Akihiro Imura It is certified that error appears in the above-identified patent and that said Letters Patent is hereby corrected as shown below:

Please amend the second inventor name as follows:

Title page, inventor:
Item (75), please change "Akihrio Imura" to --Akihiro Imura--.

Signed and Sealed this

Sixteenth Day of March, 2010

David J. Kappos
*Director of the United States Patent and Trademark Office*